April 19, 1938.   L. C. HUCK   2,114,493
RIVET AND RIVET SETTING
Filed May 14, 1935   2 Sheets-Sheet 1
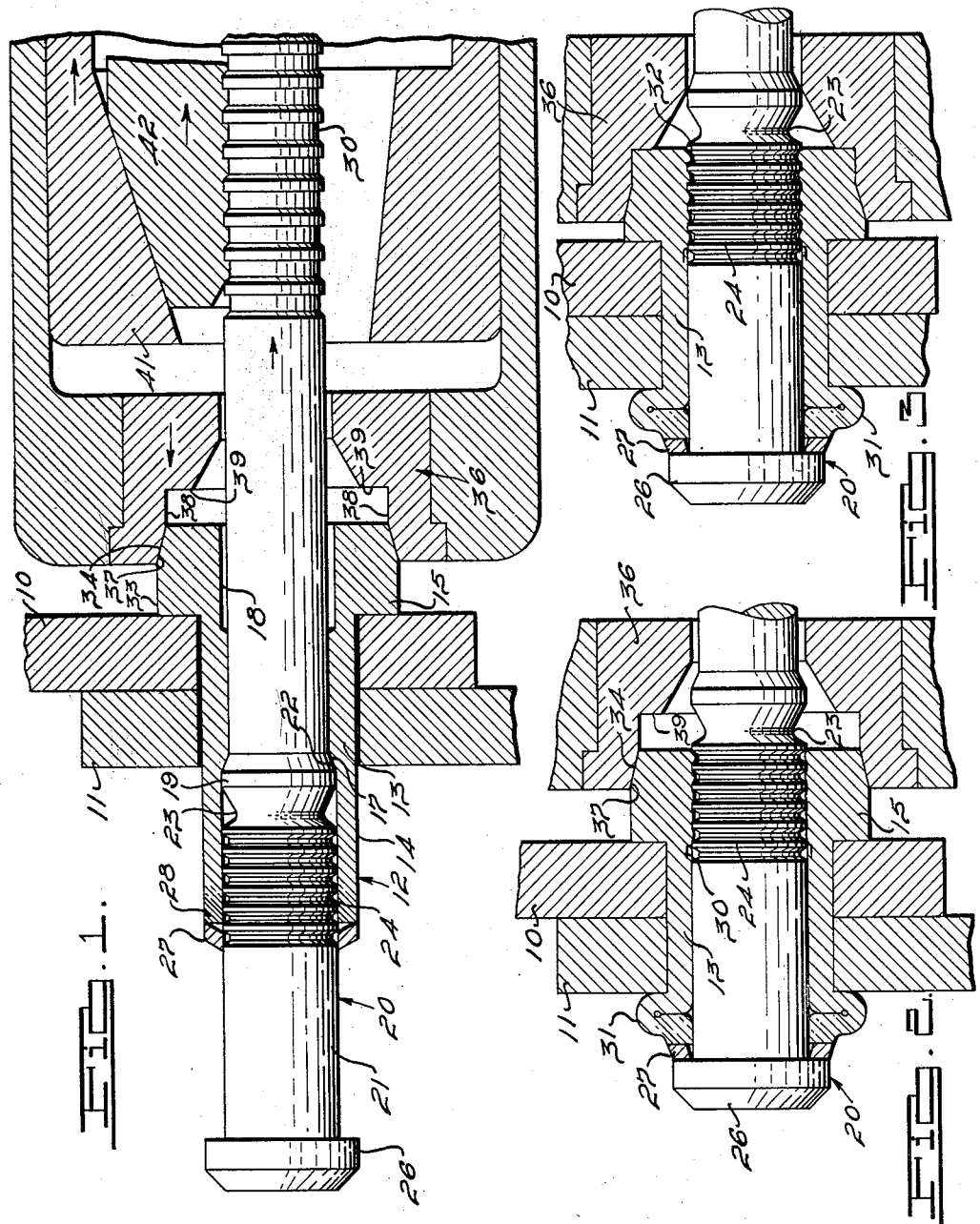
INVENTOR.
Louis C. Huck.
BY
Harness, Dickey, Pierce & Hann
ATTORNEYS.

April 19, 1938.                L. C. HUCK                2,114,493
                        RIVET AND RIVET SETTING
                        Filed May 14, 1935            2 Sheets-Sheet 2

INVENTOR.
Louis C. Huck.
BY
Harness, Dickey, Pierce & Hann.
ATTORNEYS.

Patented Apr. 19, 1938

2,114,493

UNITED STATES PATENT OFFICE 2,114,493

RIVET AND RIVET SETTING

Louis C. Huck, Grosse Pointe Village, Mich., assignor to Huxon Holding Corporation, a corporation of Michigan Application May 14, 1935, Serial No. 21,473

14 Claims. (Cl. 218—19)

The invention relates generally to riveting and it has particular relation to a rivet and an arrangement including the rivet for setting rivets in an improved manner.

In certain particulars, the invention disclosed in this application is related to the rivets disclosed in my co-pending applications for patent Ser. Nos. 627,343, filed July 29, 1932, now Patent Number 2,061,628 granted November 24, 1936; 681,362, filed July 20, 1933, now Patent Number 2,061,629 granted November 24, 1936, and to a rivet setting machine as disclosed in the application for patent of Huck, et al., Ser. No. 636,480, filed October 6, 1932, now Patent Number 2,053,719 granted September 8, 1936.

In co-pending applications Ser. No. 627,343 and 681,362, a rivet is disclosed which comprises a tubular member having a body portion adapted to project through openings in a structure to be riveted and a portion adapted to project beyond one side of the structure and to be bulbed into an annular head. The opposite end of the tubular member has a head adapted to engage the opposite side of the structure. A pin extends through the tubular member and at one end has a head adapted to apply axially directed forces to the ends of the portion of the tubular member to be bulbed, while the other end of the pin projects beyond the head on the tubular member for gripping and pulling purposes. This rivet is adapted to be set by pulling the projecting end of the pin while applying the reactionary force to the head on the tubular member and, after the rivet is set, a continued pull on the pin breaks it at a weaker and grooved portion of the pin. Also, movement of the pin required to form the bulbed head moves a grooved portion of the pin to a position within the first head on the tubular member and, after the bulbed head is formed and prior to breaking the pin, the first head is swaged so as to cause a movement or flow of metal therein into the grooved portion of the pin. This provides an interlocking arrangement, the principal purpose of which is to prevent recoil movement of the pin slightly through the tubular member and loosening of the rivet when the pin breaks, under tension, and to assist the tubular member in carrying a tension load therein; that is, a load tending to separate the riveted plates.

A machine for setting a rivet of this character is disclosed in application Ser. No. 636,480 and in this machine, a primary anvil applies the reactionary force of the pull on the pin, axially against the outer face of the first head on the tubular member, and then, after the pin is pulled to form the bulbed head and upon further increasing of the tension on the pin, a second anvil becomes effective to swage the first head on the tubular member and cause metal therein to flow into the grooved portion of the pin. The riveting machine disclosed in such co-pending application for patent is so designed that the second anvil automatically becomes effective at a predetermined pull on the pin which is greater than that required to bulb the head and less than that required to break the pin.

One object of the present invention is to provide a rivet and riveting apparatus which are so related that a single anvil may be employed for applying the reactionary force against the head on the tubular member during the rivet setting operation and for swaging metal in the head into the locking grooves on the pin at a predetermined pull on the pin.

Another object of the invention is to provide a rivet and riveting machine relation of such character that a single anvil applies the reactionary force against the head on the tubular member until the bulbed head on the tubular member is formed, and thereafter automatically becomes operable during application of the reactionary force to cause a movement of the anvil over the head first provided on the tubular member to cause it to be swaged into interlocking relation with the grooves in the pin.

Another object of the invention is to provide a relation such as mentioned wherein, after the anvil moves over the head to effect the swaging result, it again so engages the first head on the tubular member as to substantially prevent any further movement of the anvil with respect to the head.

Another object of the invention is to provide a relation of this character wherein the first head on the tubular member and the anvil are provided with tapered and cooperating portions of such character that the swaging of the head is substantially prevented until the pull on the pin and the reactionary force on the head, reach a substantially predetermined amount.

Other objects of the invention will become apparent from the following specification, from the drawings relating thereto and from the claims hereinafter set forth.

For a better understanding of the invention, reference may be had to the drawings wherein:

Figure 1 is a longitudinal and cross-sectional view, illustrating a rivet and assembly constructed according to one form of the invention, prior to setting of the rivet;

Fig. 2 illustrates the same construction after the bulbed head has been formed and prior to any substantial swaging of the head on the other end of the tubular member;

Fig. 3 illustrates the riveted construction after completion of the swaging operation, but prior to breaking of the pin;

Figure 4:
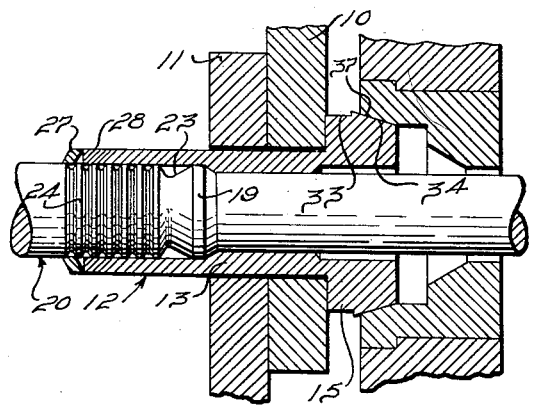
Fig. 4 is a view similar to Fig. 1, but illustrating another form of the invention.

Referring to Fig. 1, a structure to be riveted is illustrated as comprising plates 10 and 11 having substantially aligned openings for receiving the rivet. The rivet comprises a tubular member 12 having a body portion 13 adapted to be disposed in the openings in the plates, a portion 14 adapted to project beyond one side of the plates and a preformed head 15 adapted to engage the other side of the plates. It will be noted that the portion 13 lying within the openings in the plates is slightly smaller in internal diameter than the portion 14 and the junction of such portions is tapered to provide a shoulder 17. The opening in the head 15 is of substantially the same internal diameter as that of the portion 14, as indicated at 18 and it will be noted that the opening extends slightly below the head and into the tubular portion 13.

The rivet also includes a pin 20 mainly corresponding in diameter to the diameter of the opening in portion 13 of the tubular member, and beyond the left end of portion 13 a larger portion 21 on the pin is provided which corresponds in diameter to the internal diameter of the portion 14. At the junction of the smaller and larger portions of the pin, a tapered shoulder 22 is provided on the pin, which engages the shoulder 17 in the tubular member. Immediately to the left of the shoulder 22 on the pin, the latter has an extruding land 19, and an annular groove or recess 23 is provided to the left of the land which is of such root diameter that the pin will break at this point when sufficient tension is placed there. To the left of the groove 23, a series of relatively shallow locking grooves 24 are provided, and the purpose of these grooves will be mentioned presently. The left end of the pin is provided with a head 26 that initially is spaced substantially from the end of the portion 14 of the tubular member and between the head and the end of such portion, a spreader ring 27 is provided. It may be mentioned at this time that the tubular member is composed of metal which is relatively ductile as compared to the metal in the pin, and that the spreader ring 27 is relatively hard as compared to the metal in the tubular member and preferably of softer metal than the pin. Also, it may be mentioned that the extreme left end of the portion 14 of the tubular member has increased resistance to outward expansion in the shaded region indicated at 29, although, if desired, the portion 14 may have a progressively increasing resistance to bursting or outward expansion from its right end to its left end. The right end of the pin is provided with a plurality of grooves 30 for the purpose of gripping the pin when it is to be pulled.

The general manner of setting this rivet may be briefly mentioned. When the right end of the pin is gripped and pulled and the reactionary force is applied against the head 15 on the tubular member, the first thing that happens is that the pin begins to move through the tubular member and the shoulder 22 begins to expand the portion 13 thereof to fill any voids, or clearances, that may exist in the openings in the plates. As the shoulder moves through the portion 13, some dragging out of metal axially ahead of the shoulder occurs along with the radial expansion and when the shoulder reaches the opening 18, normally it will be found that some metal has moved ahead of the shoulder so as to decrease the depth of the opening. This metal, upon further movement of the shoulder, will be pressed outwardly as is generally indicated at 30 in Fig. 2, and normally this will occur only along the inner end portion of the opening 18 and particularly along that part thereof inwardly of the head 15. This avoids any dragged out metal within the head 15 and over the locking grooves therein and avoids deformation or enlargement of the head, the occurrence of which might thereafter interfere with the head swaging operation. Any excess metal thereafter ahead of shoulder 22 normally will shear off as a ring or partial ring and be passed through the opening 18 ahead of the shoulder.

Substantially at the time the land 19 has completely entered the opening 18, the head 26 engages the spreader ring 27 and continued movement of the pin then exerts axial forces through the spreader ring and against the left end of the portion 14 of the tubular member for bulbing the latter into a head 31, as shown by Fig. 2. It might be mentioned in this connection that the spreader ring may be designed to expand initially when it is initially forced against the end of portion 14 or at any time during bulbing of the portion, or at any time thereafter as long as movement of the pin to effect spreading is possible, but preferably it expands before bulbing begins. Expansion of the spreader ring increases the effective size of the head 26 on the pin, and while this is useful at any point in the bulbing procedure, particularly it is effective to prevent undesirable burying or movement of the head on the pin into the bulbed head when the pull on the pin is further increased to effect a tight connection. After completion of the bulbing operation and upon a further predetermined pull on the pin, the head 15 is swaged so as to cause metal therein to flow into the grooves 24, as indicated at 32 in Fig. 3, and this result is obtained while maintaining the pull on the pin and preventing loosening of the riveted connection. Then continued tension on the pin breaks it at the groove 23 which is then located at a point substantially adjacent the outer end face of the head 15. As stated before, this result was obtained previously and, as disclosed in the co-pending application for patents, by using a first anvil to apply the reactionary force against the outer face of the head 15, until the tension on the pin reached a predetermined amount and above that required to move the pin and complete the bulbed head formation, and then a second anvil automatically moved over the outer periphery of the head 15 and swaged it and caused metal to flow into the locking grooves in the pin.

As before stated, the present invention is mainly concerned with a design of rivet head and anvil which enables using a single anvil for accomplishing the purposes previously accomplished by two anvils, and a construction for obtaining this result will now be explained.

As shown by Fig. 1 the head 15 has a substantially cylindrical, peripheral portion 33 adjacent the plate 10 although this portion may be slightly tapered towards the outer end of the head. The outer end of the portion 33 merges into a tapered peripheral portion 34 and in the construction illustrated the angle of taper of this portion is about fifteen degrees with respect to the axis of the rivet. A machine for setting the rivet may generally correspond to that shown in the copending application of Huck, et al. Serial No. 615,544, filed June 6, 1932, now Patent Number 2,053,718, granted September 8, 1936, excepting that in place of the anvil shown in that application for patent, an anvil 36 is provided as shown herein. This anvil has a socket defined by tapered portion 37 substantially matching the tapered portion 34 on the rivet head and the open or larger end of the taper 37 is substantially equal in diameter to portion 33 of the rivet head or, if anything, is slightly larger so as to project slightly past the larger end of the latter. At the inner end of the anvil taper 37, the latter has a cylindrical land 38 and at the rear end of this land, a radial shoulder 39 is provided. The riveting mechanism also includes a jaw actuating member 41 adapted to be pulled backwardly and a plurality of jaws 42 having a tapered engagement with the jaw actuating member and which are adapted to contract about the grooved portion 30 of the rivet pin and to grip the latter and pull it upon continued movement of the jaw actuating member. The reactionary force to this pull on the jaw actuating member is applied through the anvil 36 against the tapered portion 34 of the rivet head.

The initial and full surface contact between tapered portions of the anvil and rivet head necessarily provides a strong resistance to any movement of the anvil over the head. Now in setting the rivet, the pin moves and causes expansion of the portion 13 of the tubular rivet member and after this is substantially accomplished, the head 26 on the pin effects formation of the bulbed head 31. During these steps in the riveting operation, while considerable pull on the pin is required and consequently considerable reactionary force is applied to the anvil, little, if any, movement of the anvil will occur with respect to the rivet head 15 and any slight movement that should occur is insufficient to cause any appreciable swaging action. After the bulbed head 31 has been formed, tension on the pin will increase and similarly the reactionary force applied through the anvil will increase and this will further tighten the rivet connection and draw the plates 10 and 11 tightly together and particularly will straighten the plates if either of them should be slightly bowed. While some slight additional movement of the anvil may occur as the tension on the pin further increases, the design is such that no appreciable swaging action will be effected until the tension on the pin is greater than that required to tighten the plates in the manner mentioned. As the tension on the pin further increases, however the reactionary force finally becomes sufficient to initiate a continuous movement of the anvil over the rivet head and once this movement is really initiated, very little or no additional tension on the pin is required to complete movement of the anvil so as to cause metal in the head 15 to be swaged into the locking grooves 24. Generally it may be said that no swaging movement of the anvil occurs up to a certain tension on the pin, then slight movement of the anvil may be caused but insufficient to effect any undesirable swaging, and then at a substantially predetermined tension, the real resistance to movement of the anvil is overcome and a continuous or complete swaging movement is initiated without any appreciable increase in tension. It may be mentioned, however, that as the anvil begins its real swaging action, the head 15 extrudes through the land 38 of the anvil and frictional engagement between the extruding portion and the land 38 introduces further resistance to the swaging action. This might be relieved by having a shorter land and then having it increase slightly in diameter as it approaches the radial wall 39, but it has been found that the increase in resistance is not appreciable, or at least is not undesirable. Finally, the radial wall 39 of the anvil engages the end face of the rivet head and interrupts the swaging operation and particularly this is desirable to prevent engagement of the anvil with the plate 10 and any movement of the rivet head away from the plate upon further increase in tension on the pin. After this procedure, increased tension on the pin will break it at the groove 23 and the riveting operation is completed.

While the taper 34 and the taper 37 have been shown at an angle of approximately 15 degrees, it should be understood that the angularity may be changed considerably while still obtaining desirable results. The length of the taper also is a factor to be considered as a varying resistance to swaging may be obtained by varying the length of the tapers. It follows that the length and angularity of tapers may be interrelated to obtain the desired resistance before real swaging is initiated. Moreover the amount of slight movement of the anvil prior to effecting a real swaging movement may be varied depending upon the amount of and angularity of tapered engagement. In general, the character of the engagement may vary within a considerable range while still obtaining a relation which will insure desirable tightening of the connection before the head is swaged into the locking grooves, while also insuring that such swaging occurs before the pin breaks. Mainly it is desired to have an engagement which will substantially prevent any swaging action until the tension on the pin is sufficient to tighten the plates after the bulbing operation is effected, while still causing swaging to be effected before the tension is sufficient to break the pin.

Figure 5:
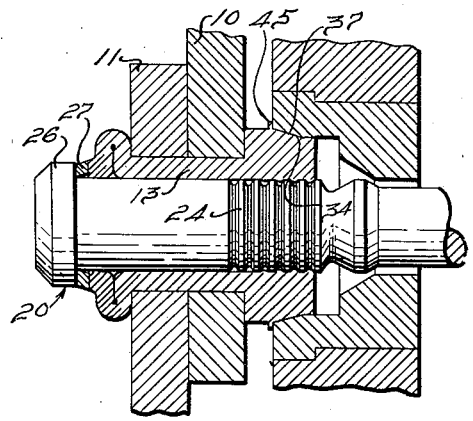
Fig. 5 illustrates the rivet assembly shown by Fig. 4 during a phase of the swaging operation.

The construction shown in Figs. 4 and 5 is similar to that already described, but in this case the larger end of the taper 34 on the rivet head 15 is larger than the diameter of portion 33. The anvil taper is substantially the same as shown by Fig. 1 and accordingly its open end is substantially equal in diameter to that of portion 33, and therefore terminates short of the large end of taper 34. This construction operates substantially in the same manner as previously described, excepting that a greater initial resistance is offered to movement of the anvil and consequently creeping of the anvil slightly during the preliminary riveting steps and during tightening of the connection is lessened. In this construction practically no movement of the anvil will occur until the tension on the pin almost reaches that required to effect the real swaging operation and once the anvil begins to move, the larger end of the taper on the anvil ordinarily will shear off a ring-like segment indicated at 45 in Fig. 5. Once the greater initial resistance to swaging is overcome, continued swaging will occur practically in the same way as described in connection with Fig. 1 with the probability that it will continue with even a slight drop in pull on the pin. Completion of the riveting operations in Figs. 4 and 5 is substantially the same as previously described.

Figure 6:
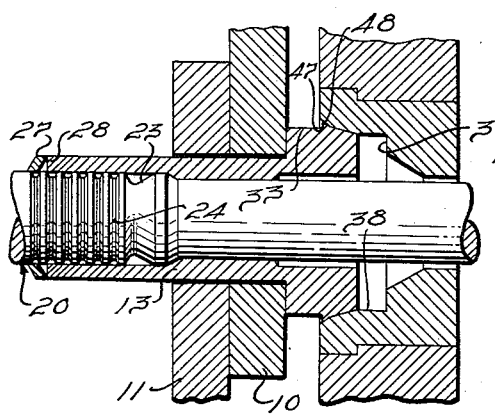
Fig. 6 is a view similar to Fig. 1, illustrating another form of the invention.

In the construction shown by Fig. 6 the rivet head, in addition to having the taper 37, has a smaller tapered portion 47 of greater angularity between the taper 37 and the cylindrical portion 33 and the anvil has a corresponding tapered entry 48. In this case, the engagement between the tapers 34 and 37 and 47 and 48 provides a greater resistance to initial swaging, but once real swaging is initiated it will be completed substantially as previously described. It may be mentioned, however, in this case, that the tapered portion 47 on the rivet head will not shear off but will flow under the taper 37 on the anvil and in effect become a part of the head.

Figure 7:
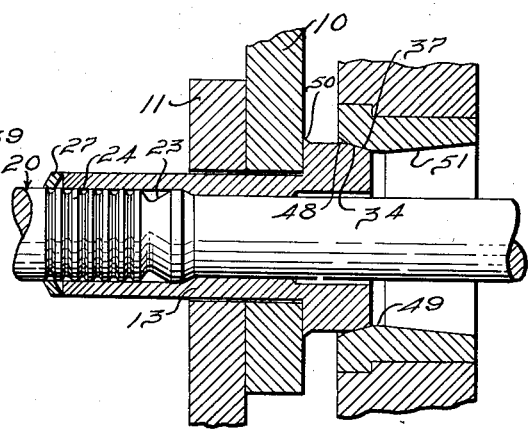
Fig. 7 is a similar view illustrating another form of the invention.

In the construction shown in Fig. 7, substantially the same anvil is employed as in Fig. 6 excepting that a smaller cylindrical land 49 is employed which merges into an outwardly tapered relief 51 and the radial shoulder 39 is eliminated. The rivet head substantially corresponds to that shown by Fig. 1 with the exception that a small tapered portion 50 is provided on the head adjacent the plate 10, which substantially corresponds to the tapered entry 48 on the anvil. This rivet will set in substantially the same manner as that shown by Fig. 1, but at the end of the swaging operation, the taper 48 on the anvil will engage the taper 50 on the rivet head, and this, in conjunction with the tapered engagement, will interrupt further swaging operation. In general, therefore, the principal difference between Fig. 7 and Fig. 1 is that instead of using the radial shoulder 39 for interrupting the swaging operation, the swaging operation is interrupted by engagement of the anvil taper 48 with the tapered portion 50 on the rivet.

In general, therefore, the several forms of the invention illustrated provide an engagement between the anvil and rivet head, and particularly a tapered surface engagement, which will set up a high resistance to drawing of the rivet head into the anvil or movement of the anvil over the head. Moreover, this resistance is such that little or no movement of the anvil over the head will occur until the pull on the pin is sufficient to have accomplished expansion of rivet portion 13, formation of bulbed head 31 and drawing of the plates 10 and 11 very tightly together. Also, this resistance is such that it will be overcome at a pull on the pin less than that required to break it, and when overcome, will allow a completion of the swaging action without any undesirable increase in pull on the pin and at least without increasing the pull to a degree sufficient to break the pin. It will be appreciated that the angularity and length of the tapered engagement may vary within a considerable range so as to obtain satisfactory results. Preferably of course, it is desired that the real swaging should not occur until the pull on the pin approaches that required to break the pin and that it then occur without an appreciable increase in force such as might break the pin. So as to insure proper setting of the rivet, swaging should be completed without introducing any possibility of breaking the pin until after swaging is effected. The invention enables obtaining the desired results while still permitting considerable range in the swaging procedure.

Additionally the invention provides an efficient means for positively preventing further swaging movement of the anvil after sufficient swaging is effected. This prevents applying some of the reactionary force to the plates by direct engagement of the anvil therewith and possible pulling of the rivet head away from the plates.

Although more than one form of the invention has been illustrated and described in detail, it will be apparent to those skilled in the art that various modifications may be made without departing from the scope of the appended claims.

What I claim is:

1. The method of setting a rivet of a type comprising a tubular member having a head at one end adapted to engage one side of a structure to be riveted and a body portion adapted to be enlarged at the other side of the structure into a second head, and a pin extending through the member and having means at one end for effecting such enlargement of the end of tubular member when the opposite end of the pin is pulled and the reactionary force is applied to the first head on the tubular member, wherein the method comprises applying tensile forces to the end of the pin and simultaneously applying the reactionary force by means of an anvil to the first head on the tubular member until such enlargement is effected, and then effecting a swaging of the first head onto the pin by increasing the tensile force on the pin and applying the increased reactionary force through the same anvil.

2. The method of setting a rivet of a type comprising a tubular member having a head at one end adapted to engage one side of a structure to be riveted and a body portion adapted to be enlarged at the other side of the structure into a second head, and a pin extending through the member and having means at one end for effecting such enlargement of the end of tubular member when the opposite end of the pin is pulled and the reactionary force is applied to the first head on the tubular member, wherein the method comprises applying tensile forces to the end of the pin, and applying the reactionary force to the first head on the tubular member through an anvil having such engagement with said head that the latter will be swaged onto the pin by the same anvil after the forces exceed those necessary to form the enlargement on the tubular member.

3. The method of setting a rivet of a type comprising a tubular member having a head at one end adapted to engage one side of a structure to be riveted and a body portion adapted to be enlarged at the other side of the structure into a second head, and a pin extending through the member and having means at one end for effecting such enlargement of the end of the tubular member when the opposite end of the pin is pulled and the reactionary force is applied to the first head on the tubular member, wherein the method comprises applying tensile forces to the end of the pin, and applying the reactionary force to the first head on the tubular member through an anvil having conical surface engagement with the head, wherein the conical engagement is such as to resist swaging of the head onto the pin until the forces are sufficient to effect the enlargement on the tubular member.

4. The method of setting a rivet of a type comprising a tubular member having a head at one end adapted to engage one side of a structure to be riveted and a body portion adapted to be enlarged at the other side of the structure into a second head, and a pin extending through the member and having means at one end for effecting such enlargement of the end of the tubular member when the opposite end of the pin is pulled and the reactionary force is applied to the first head on the tubular member, wherein the method comprises applying tensile forces to the end of the pin and applying the reactionary force to the first head on the tubular member through an anvil having conical surface engagement with the head, wherein the conical engagement is such as to resist swaging of the head onto the pin until the forces are sufficient to effect the enlargement on the tubular member and wherein an increase in such forces then effects axial movement of the anvil over the head to effect such swaging.

5. In apparatus for setting rivets of the class described, an anvil for swaging a rivet head to a pin during the rivet setting operation comprising a member having a cylindrical recess in one face thereof provided with an outwardly flaring conical mouth and an abutment wall for limiting movement of the rivet head into said recess during the swaging operation.

6. In apparatus for setting rivets of the class described, a rivet head swaging anvil comprising a member provided with an annular conical working face, the apex angle of said cone being approximately thirty degrees, and abutment means on the anvil for limiting the movement of a rivet axially of said working face during the swaging operation.

7. Apparatus for setting the type of rivet comprising a tubular member having a head at one end and a pin adapted when pulled partly through said tubular member to form a second head at the opposite end, comprising, means adapted to engage the rivet pin, a unitary swaging anvil adapted to engage the head end of the tubular member, means for exerting a pulling force on said gripping means and an equal and opposite reactive force on the anvil to form said second head, said anvil being adapted to swage the tubular member onto said pin when the pulling and reactive forces reach a predetermined amount.

8. Apparatus for setting the type of rivet comprising a tubular member having a head at one end and a pin adapted when pulled partially through said tubular member to form a second head at the opposite end, comprising, means adapted to engage the pin, a unitary swaging anvil adapted to engage and swage the tubular rivet member onto the pin, means for exerting a pulling force on said pin engaging means and an equal and opposite reactive force entirely upon said anvil, said pulling and reactive forces being effective to move the pin engaging means and anvil in opposite directions to form the second head on the opposite end of the tubular member, and said swaging anvil being effective to swage said rivet members together when the pulling and reactive forces exceed that required for the head forming operation.

9. Apparatus for setting the type of rivet comprising a tubular member having a head at one end and a pin adapted when pulled partially through said tubular member to form a second head at the opposite end, comprising, a gripping member adapted to engage the rivet pin, means for exerting a pulling force on said pin, a unitary anvil adapted to engage the tubular member and exert thereon the entire reactive force to said pulling force during the formation of the second head, said anvil having a substantially cylindrical recess therein having an outwardly flaring conical mouth, the diameter of the cylindrical portion of the recess being slightly less than the diameter of the head end of the tubular rivet member and the diameter of the recess and the angle of said conical mouth being so proportioned with respect to the characteristics of the head end of the tubular rivet member that said anvil will not swage the head end to the rivet pin until the pulling and reactive forces exceed that required to form the second head at the opposite end of the tubular member.

10. A rivet including a tubular portion having a head at one end thereof, said head having an annular conical peripheral surface adjacent the end face thereof, and a substantially cylindrical peripheral surface extending towards the opposite face from the edge of the conical surface.

11. A rivet including a tubular portion having a head at one end thereof, said head having an annular conical peripheral surface adjacent the end face thereof, and a substantially cylindrical peripheral surface extending towards the opposite face from the edge of the conical surface, said conical surface lying in a cone having an apex angle of approximately thirty degrees.

12. A rivet including a tubular portion having a head at one end thereof, said head having an annular conical peripheral surface adjacent the end face thereof, and a substantially cylindrical peripheral surface extending towards the opposite face from the edge of the conical surface, the diameter of said conical portion at the juncture with the cylindrical portion being greater than that of the cylindrical portion.

13. A rivet including a tubular portion having a head at one end thereof, said head having an annular conical peripheral surface adjacent the end face thereof, a substantially cylindrical peripheral surface adjacent the opposite face thereof, and an intermediate conical surface extending axially from the first mentioned conical surface to the cylindrical surface, the maximum diameter of the first mentioned conical surface being approximately equal to the adjacent minimum diameter of the intermediate conical surface, and also the diameter of the cylindrical surface, and the maximum diameter of the intermediate conical surface being greater than the diameter of the cylindrical surface.

14. A rivet including a tubular member having a head at one end, a pin extending through said member and having circumferential grooves therein, the peripheral surface of said head including an annular conical portion adjacent the end face of the head, and a cylindrical portion extending toward the opposite face of the head from said conical portion, and the head of the tubular member being of slightly greater internal diameter than the smallest internal diameter of the tubular body portion.

LOUIS C. HUCK.